Aug. 15, 1939.   J. A. SHIFFLETT   2,169,664
REFRIGERATION SYSTEM
Filed July 29, 1936   2 Sheets-Sheet 1
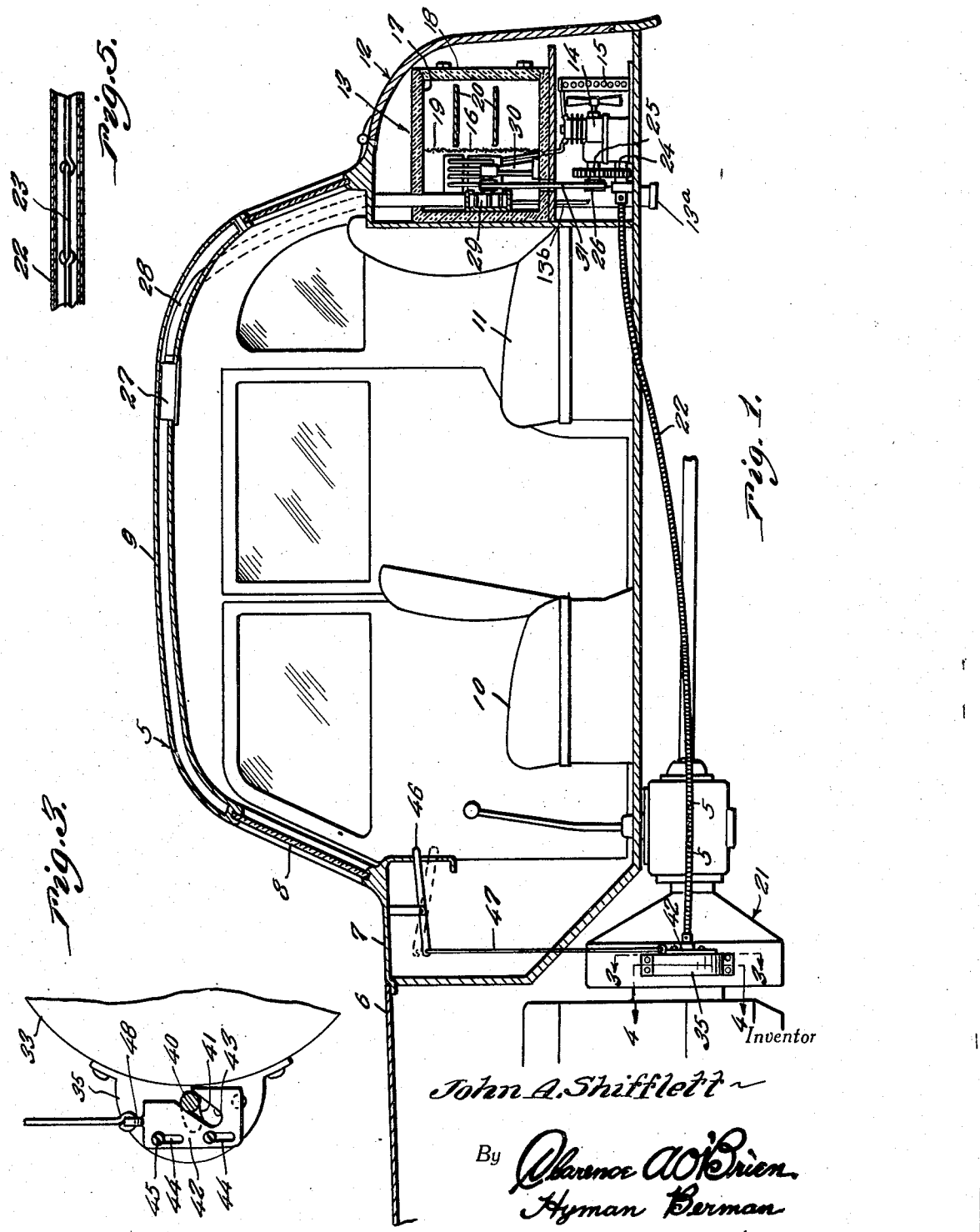
Inventor
John A. Shifflett
By Clarence A. O'Brien
Hyman Berman
Attorneys Aug. 15, 1939.   J. A. SHIFFLETT   2,169,664
REFRIGERATION SYSTEM
Filed July 29, 1936    2 Sheets-Sheet 2
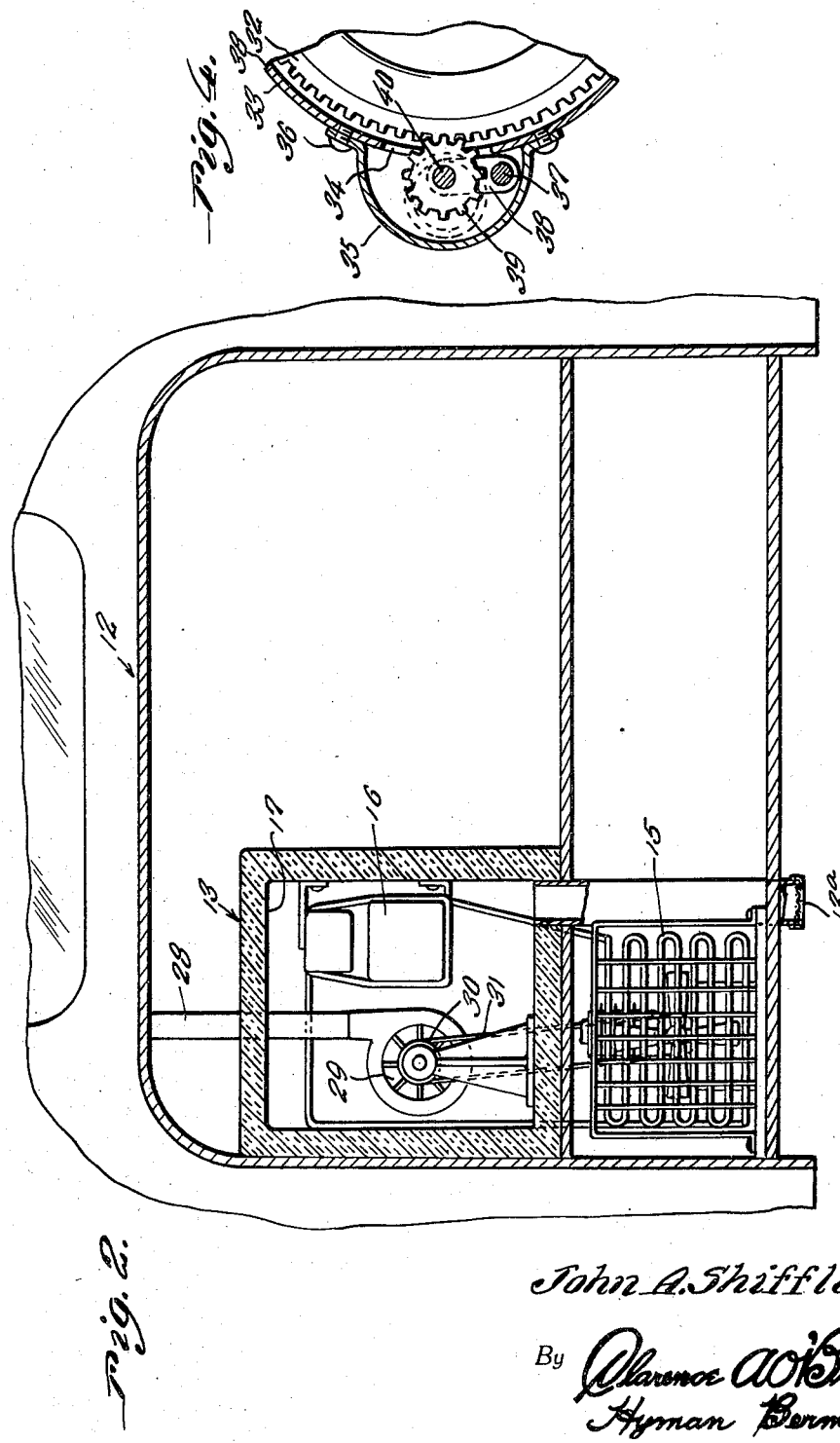
Inventor
John A. Shifflett
By Clarence A. O'Brien
Hyman Berman
Attorneys Patented Aug. 15, 1939

2,169,664

UNITED STATES PATENT OFFICE 2,169,664

REFRIGERATION SYSTEM

John A. Shifflett, St. Louis, Mo., assignor of one-third to Oscar H. Jacobsmeyer and one-third to Lotus Foval, both of St. Louis, Mo.

Application July 29, 1936, Serial No. 93,272

2 Claims. (Cl. 62—117)

This invention relates to new and useful improvements in the general art of refrigeration and more particularly to a refrigeration system for vehicles such as automobiles and the like.

The principal object of the present invention is to provide a refrigeration compartment for automobiles and like vehicles in which articles of food and drink can be placed and kept cool over any indefinite period of time.

Another important object of the invention is to provide refrigerating means for vehicles which can be conveniently controlled from the driver's seat.

Still another important object of the invention is to provide a combination with an automobile, a refrigerator and means for directing cool air from the refrigerator into the occupant's compartment of the vehicle.

These various and other important objects and advantages of the invention will become apparent to the reader of the following specification.

In the drawings:—

Figure 1 represents a fragmentary longitudinal sectional view.

Figure 2 is a fragmentary cross-sectional view through the rear portion of the vehicle.

Figure 3 is a section on line 3—3 of Figure 1.

Figure 4 is a fragmentary enlarged sectional view on line 4—4 of Figure 1.

Figure 5 is a section on line 5—5 of Figure 1.

Referring to the drawings wherein like numerals designate like parts, it can be seen that numeral 5 generally refers to an automobile structure wherein numeral 6 represents the hood, numeral 7 the cowl, numeral 8 the windshield and numeral 9 the top. Reference characters 10—11 denote the front and rear seat and while numeral 12 is the usual baggage compartment at the rear of the closed body type of vehicle.

In carrying out the present invention, inside of this baggage compartment is placed the refrigerator generally referred to by numeral 13. This refrigerator consists of the compressor 14, condenser 15 and freezing unit 16. The freezing unit 16 is located within the box 17 which box is located within the baggage compartment 12. The box 17 is provided with hinged front door 18. The interior of the box 17 is divided by the vertical partition 19, the forward portion of the box 17 being provided with shelves 20 upon which food stuffs and drinks can be placed. An air inlet duct 13a extends into the baggage compartment 12 to the box 17 and is provided with a slot 13b for the passage of air thereinto blowing over the condenser 15.

From the flywheel housing generally referred to by numeral 21 extends the conduit 22 in which the flexible shaft 23 is longitudinally disposed, terminating at its rear end with the pinion 24 thereon which meshes with the gear 25 carrying a pulley 26. A cold air register at 27 is provided on the inner side of the top 9 and to this extends the conduit 28 from the inside of the box 17 adjacent the freezing unit 16. The lower portion of this conduit 28 is provided with a housing in which the blower fan 29 operates, this fan being provided with a shaft on which is located the pulley 30. A belt 31 is trained over the pulleys 26—30 so that as the shaft 23 is rotated by the flywheel 32 (see Figure 4) motion will be imparted to the belt 31 and to the fan 29 for forcing cold air through the register 27 into the occupant compartment of the vehicle, while at the same time operating the compressor 14 and maintaining the refrigerating plant in operation.

The flywheel assembly has the housing 33 in one side of which is located the opening 34 over which the hood 35 is located and secured by screws or rivets 36 to the housing 33.

A pin 37 is disposed horizontally through the hood 35 and on this the arm 38 is swingable and carries the pinion 39 which is meshable with the gear 38 on the flywheel 32. The pin 40 extends through the pinion 39 and one end is connected to the flexible shaft 23, it being understood that the pinion 39 is keyed to the pin 40.

The side walls of the hood 35 are provided with arcuate slats extending from the housing 33 outwardly and through these the end portions of the pin 40 extend, the slots being denoted by reference character 41.

Slidable on one side of the hood 35 is the cam plate 42 which is provided with an obliquely extending slot 43 opening through one side edge thereof and receiving the rear end portion of the pin 40. The plate 42 is provided with vertical slots 44 through which screws 45 are disposed and driven into the side wall of the hood 35. Thus the plate 42 is vertically slidable on the outside of the hood 35 for moving the pin 40 inwardly or outwardly to bring the pinion 39 into or out of engagement with the flywheel gear 38. As is shown in Figure 1, on the main under side of the top portion of the cowl 7 a rockable hand lever 46 is mounted and from the forward end of this extends the rod or elongated element 47 to connect the ear 48 on the upper end of the cam plate 42. Obviously by depressing the forward end of this lever 46 the cam plate can be lifted for moving the pinion 39 away from the flywheel gear 38.

Furthermore, it is to be understood that the flexible shaft housing 22 is connected in such a manner to the hood 35 that some of the lubricant thrown out of the opening 34 by the flywheel will seep along the conduit 22 and lubricate the gear 24 and gear 25.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

1. In a power take-off for use with the toothed flywheel of an automobile engine, a driven shaft mounted alongside the fly-wheel of the engine for shifting laterally toward and from said wheel, a driven gear fast on said shaft and shiftable thereby into and out of mesh with said wheel, and means to shift said shaft including a lever adapted to be mounted in the body of the automobile, a plate slidably mounted alongside said shaft and having a shaft camming slot therein in which said shaft extends, and an operating connection between said lever and plate.

2. The combination with an automobile body having a hollow side wall and top structure and a luggage compartment, of a refrigerating box in said compartment, a refrigerating unit in said box for cooling the air therein, a conduit extending upwardly through the bottom of the compartment and into the bottom of said box for introducing atmospheric air into the box, a register in the top of the body opening into the latter, and means to discharge air under forced draft from said box and into said register comprising a fan casing in said box opening thereinto, a discharge pipe leading from said casing and box to said register and concealed in said hollow wall structure, a combined suction and blower fan in said casing operative to draw air thereinto from said box and to force the same through said pipe, and means to operate said fan.

JOHN A. SHIFFLETT.